US012704437B2

(12) United States Patent
Maxwell et al.

(10) Patent No.: US 12,704,437 B2

(45) Date of Patent: Aug. 11, 2026

(54) ENGINE COMPONENT TEST SYSTEM WITH CRYOGENIC COOLING SYSTEM

(71) Applicant: Pratt & Whitney Canada Corp., Longueuil (CA)

(72) Inventors: Thomas Maxwell, Toronto (CA); Matthew Kidd, Toronto (CA); Damiano Magnoli, Milton (CA); James Elliott, Hamilton (CA); Michael Joseph, Otterville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 362 days.

(21) Appl. No.: 18/377,434

(22) Filed: Oct. 6, 2023

(65) Prior Publication Data

US 2025/0116571 A1 Apr. 10, 2025

(51) Int. Cl.
*G01M 15/02* (2006.01)
*G01M 15/14* (2006.01)

(52) U.S. Cl.
CPC ............ *G01M 15/02* (2013.01); *G01M 15/14* (2013.01)

(58) Field of Classification Search
CPC ......... G01M 15/02; G01M 15/14; F02C 3/14; F02C 7/141; F05D 2240/35; F05D 2260/12; F01D 21/003; F23R 3/00
See application file for complete search history.

(56) References Cited

U.S. PATENT DOCUMENTS 7,506,555 B2 3/2009 Brostmeyer
7,958,777 B1 6/2011 Davies
8,573,038 B1 11/2013 Crutchfield
9,654,161 B2 5/2017 Brostmeyer
2007/0084217 A1 * 4/2007 Nicholls ................ F23R 3/283
60/752

(Continued)

FOREIGN PATENT DOCUMENTS

CN 104634578 B 4/2017
CN 112881021 A * 6/2021 ............ G01M 15/02
CN 113606067 A * 11/2021 ....... F02M 35/10026

(Continued)

OTHER PUBLICATIONS

EP Search Report for EP Patent Application No. 24205040.9 dated Jan. 28, 2025.

(Continued)

*Primary Examiner* — Timothy P Graves

(74) *Attorney, Agent, or Firm* — Getz Balich LLC

(57) ABSTRACT

A test system is provided for a component of an engine. This test system includes a combustor test section and an air system. The combustor test section includes a fuel injector, an ignitor and a combustion chamber. The fuel injector is configured to direct fuel into the combustion chamber for mixing with cooled air. The ignitor is configured to ignite a mixture of the fuel and the cooled air within the combustion chamber. The air system is configured to deliver the cooled air to the combustor test section. The air system includes a compressed air source, a cryogenic cooling system and an air circuit. The cryogenic cooling system includes a cryogenic heat exchanger. The air circuit extends through the cryogenic heat exchanger and fluidly couples the compressed air source to the combustor test section.

18 Claims, 2 Drawing Sheets

(56) References Cited

U.S. PATENT DOCUMENTS

| | | | | |
|---|---|---|---|---|
| 2016/0030607 | A1 * | 2/2016 | Newman .................. | A23B 4/09 62/304 |
| 2016/0305436 | A1 | 10/2016 | Brostmeyer | |

FOREIGN PATENT DOCUMENTS

| | | | | |
|---|---|---|---|---|
| CN | 112881021 | B | | 5/2022 |
| CN | 217288756 | U | * | 8/2022 |
| CN | 116067663 | A | | 5/2023 |
| JP | S59193334 | A | | 11/1984 |

OTHER PUBLICATIONS

EP Office Action for EP Patent Application No. 24205040.9 dated Apr. 1, 2026.

* cited by examiner

200
Dry compressed air
202
Precool the dried compressed air
204
Further cool the compressed precooled air
206
Direct the compressed cooled air to combuster test section
208

ENGINE COMPONENT TEST SYSTEM WITH CRYOGENIC COOLING SYSTEM

TECHNICAL FIELD

This disclosure relates generally to systems and methods for testing one or more components of an engine.

BACKGROUND INFORMATION

A combustor test section may be used for testing one or more components of a gas turbine engine. The combustor test section may receive compressed air cooled by a refrigeration system. While such an engine component testing arrangement has various benefits, there is still room in the art for improvement.

SUMMARY

According to an aspect of the present disclosure, a test system is provided for a component of an engine. This test system includes a combustor test section and an air system. The combustor test section includes a fuel injector, an ignitor and a combustion chamber. The fuel injector is configured to direct fuel into the combustion chamber for mixing with cooled air. The ignitor is configured to ignite a mixture of the fuel and the cooled air within the combustion chamber. The air system is configured to deliver the cooled air to the combustor test section. The air system includes a compressed air source, a cryogenic cooling system and an air circuit. The cryogenic cooling system includes a cryogenic heat exchanger. The air circuit extends through the cryogenic heat exchanger and fluidly couples the compressed air source to the combustor test section.

According to another aspect of the present disclosure, another test system is provided for a component of an engine. This test system includes a housing and an air system. The housing includes a chamber inlet, a chamber outlet and an internal chamber fluidly coupled with and between the chamber inlet and the chamber outlet. The housing is configured to receive the component of the engine within the internal chamber. The air system is configured to deliver cooled air to the internal chamber through the chamber inlet. The air system includes a compressed air source, a cryogenic cooling system and an air circuit. The cryogenic cooling system includes a cryogenic liquid source and a cryogenic heat exchanger. The cryogenic liquid source is configured to provide a cryogenic liquid to the cryogenic heat exchanger. The air circuit extends through the cryogenic heat exchanger and fluidly couples the compressed air source to the chamber inlet.

According to still another aspect of the present disclosure, a method is provided for testing a component of an engine. This method includes: directing compressed air into an air passage of a cryogenic heat exchanger; directing a cryogenic liquid into a cryogenic liquid passage of the cryogenic heat exchanger; transferring heat energy from the compressed air in the air passage, through the cryogenic heat exchanger, into the cryogenic liquid in the cryogenic liquid passage to provide cooled air; and directing the cooled air into a housing. The component of the engine is disposed within an internal chamber of the housing.

A combustor test section may include the housing. The internal chamber may include a combustion chamber.

The method may include cooling the cryogenic heat exchanger with a quantity of dry ice.

The method may include directing the compressed air through a refrigeration heat exchanger of a refrigeration cooling system to precool the compressed air. The refrigeration heat exchanger may be upstream of the cryogenic heat exchanger.

The method may include directing the compressed air through an air dryer to lower a dewpoint temperature of the compressed air to negative fifty degrees Fahrenheit or lower. The air dryer may be upstream of the cryogenic heat exchanger.

The cryogenic cooling system may also include a cryogenic liquid source. The cryogenic heat exchanger may include a cryogenic liquid passage and an air passage. The cryogenic liquid passage may be fluidly coupled with and downstream of the cryogenic liquid source. The air circuit may include the air passage.

The cryogenic liquid passage may be configured to receive a cryogenic liquid from the cryogenic liquid source. The air passage may be configured to receive compressed air from the compressed air source. The cryogenic heat exchanger may be configured to transfer heat energy from the compressed air flowing in the air passage into the cryogenic liquid flowing in the cryogenic liquid passage.

The cryogenic liquid source may be configured as or otherwise include a reservoir containing liquid nitrogen.

The cryogenic cooling system may also include a heat exchange circuit, a bypass circuit and a pressure relief valve. The heat exchange circuit may include the cryogenic liquid passage. The bypass circuit may bypass the cryogenic heat exchanger. The heat exchange circuit and the bypass circuit may be downstream of and may be fluidly coupled to the cryogenic liquid source through the pressure relief valve.

The cryogenic cooling system may also include an emergency shutoff valve fluidly coupled with and between the cryogenic liquid source and the cryogenic liquid passage.

The cryogenic cooling system may also include a control valve fluidly coupled with and between the cryogenic liquid source and the cryogenic liquid passage.

The cryogenic cooling system may also include a flowmeter and a controller in signal communication with the control valve and the flowmeter. The controller may be configured to control operation of the control valve based on a signal output from the flowmeter.

The cryogenic liquid passage may be fluidly coupled with and between the control valve and the flowmeter. The flowmeter may be downstream of the cryogenic liquid passage.

The test system may also include a quantity of dry ice arranged with the cryogenic heat exchanger.

The air system may also include a refrigeration cooling system with a refrigeration heat exchanger. The air circuit may also extend through the refrigeration heat exchanger. The cryogenic heat exchanger may be between the refrigeration heat exchanger and the combustor test section along the air circuit.

The air system may also include an air dryer. The air circuit may extend through the air dryer. The cryogenic heat exchanger may be between the air dryer and the combustor test section along the air circuit.

The air dryer may be configured to lower a dewpoint temperature of compressed air received from the compressed air source to negative fifty degrees Fahrenheit or lower.

The test system may also include a combustor test section which includes the housing.

The housing may be configured as or otherwise include an insulated container.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
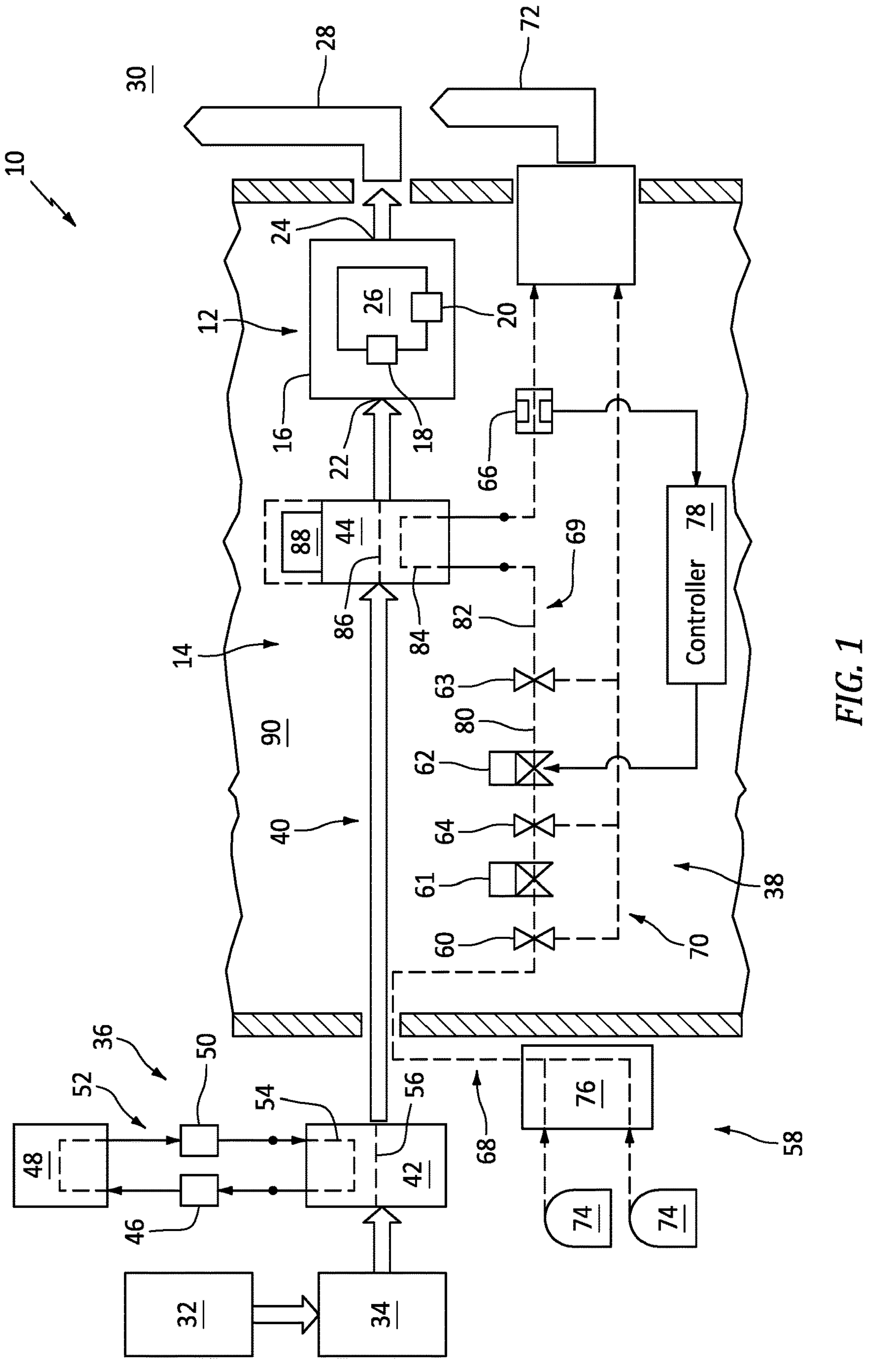
FIG. 1 is a schematic illustration of a test system for testing one or more components of an engine.

FIG. 1 illustrates a test system 10 for testing one or more components of an engine. For ease of description, the engine may be described below as a gas turbine engine. Examples of the gas turbine engine include, but are not limited to, a turbofan engine, a turbojet engine, a turboprop engine, a turboshaft engine, an auxiliary power unit (APU) engine and an industrial engine. The test system 10 of the present disclosure, however, is not limited to gas turbine engine applications. The test system 10, for example, may alternatively test component(s) for a reciprocating piston engine, a rotary engine (e.g., a Wenkel engine) or the like. The test system 10 of FIG. 1 includes a combustor test section 12 and an air system 14.

The combustor test section 12 includes a test section housing 16, a fuel injector 18 and an ignitor 20. The test section housing 16 includes a housing inlet 22, a housing outlet 24 and a combustion chamber 26; e.g., an internal chamber. The housing inlet 22 is fluidly coupled with and downstream of the air system 14. The housing outlet 24 is fluidly coupled with and upstream of a combustion products exhaust 28 to an environment 30 external of the combustor test section 12 and, more generally, the test system 10. The combustion chamber 26 is within the test section housing 16. The combustion chamber 26 is fluidly coupled with and located between the housing inlet 22 and the housing outlet 24. The fuel injector 18 is configured to direct (e.g., inject) fuel into the combustion chamber 26. The ignitor 20 is configured to ignite a mixture of the fuel and compressed cooled air to generate combustion products within the combustion chamber 26.

The combustor test section 12 is configured to receive the engine component(s) to be tested by the test system 10. The engine component(s), for example, may be disposed within the combustion chamber 26. The engine component(s) may be arranged upstream of the combustion chamber 26; e.g., between the housing inlet 22 and the combustion chamber 26. The engine component(s) may be arranged downstream of the combustion chamber 26; e.g., between the combustion chamber 26 and the housing outlet 24. The engine component(s) may also or alternatively form a portion of the combustor test section 12. For example, one of the engine component(s) may be the fuel injector 18 or a combustor wall forming a peripheral boundary of the combustion chamber 26. The present disclosure, however, is not limited to such exemplary engine component(s) to be tested by the test system 10.

The air system 14 is configured to deliver the compressed cooled air to the combustor test section 12. The air system 14 of FIG. 1 includes a compressed air source 32, an air dryer 34 and one or more air cooling systems 36 and 38. This air system 14 also includes an air circuit 40 (e.g., an open loop flowpath) which extends longitudinally between and fluidly couples an outlet from the compressed air source 32 and an inlet into the combustor test section 12. Between the compressed air source 32 and the combustor test section 12, the air circuit 40 of FIG. 1 extends (e.g., sequentially) through the air dryer 34, a refrigeration heat exchanger 42 of the refrigeration cooling system 36 and a cryogenic heat exchanger 44 of the cryogenic cooling system 38.

The compressed air source 32 is configured to output a flow of compressed air during operation of the test system 10. The compressed air source 32, for example, may be or otherwise include a compressed air reservoir. Examples of the compressed air reservoir include a tank, a cylinder, a pressure vessel, a bladder or any other type of compressed air storage container. The compressed air source 32 may alternatively be or also include an air compressor. This air compressor may directly output the compressed air. Alternatively, the air compressor may charge the compressed air reservoir with the compressed air for subsequent output.

The air dryer 34 is configured to dry the compressed air to provide dried compressed air. More particularly, the air dryer 34 is configured to remove moisture from the compressed air in order to lower a dewpoint temperature of the compressed air. The air dryer 34 of FIG. 1, for example, may be sized and configured to lower the dewpoint temperature of the compressed air below minus thirty or forty degrees Fahrenheit (−30° F., −40° F.); e.g., equal to or below minus fifty degrees Fahrenheit (−50° F.) or below.

The refrigeration cooling system 36 and its refrigeration heat exchanger 42 are configured to precool the (e.g., dried) compressed air to provide compressed precooled air. The refrigeration cooling system 36 of FIG. 1, for example, includes the refrigeration heat exchanger 42, a compressor 46, a condenser 48, an expansion valve 50 and refrigerant. The refrigeration cooling system members 42, 46, 48 and 50 of FIG. 1 are arranged in a closed loop refrigeration circuit 52, and the refrigerant is contained and circulated within the refrigeration circuit 52. The compressor 46 is configured to compress the refrigerant. The condenser 48 is configured to transfer heat energy out of the compressed refrigerant and into another fluid such as ambient air. The condenser 48 may thereby condense and cool the refrigerant flowing therethrough. The expansion valve 50 is configured to expand the cooled refrigerant thereacross. The refrigeration heat exchanger 42 of FIG. 1 is configured as an evaporator. This refrigeration heat exchanger 42 includes a refrigerant passage 54 and an air passage 56. The refrigerant passage 54 is part of the refrigeration circuit 52 and receives the expanded, cooled refrigerant from the expansion valve 50. The air passage 56 is part of the air circuit 40 and receives the dried compressed air from the air dryer 34. The refrigeration heat exchanger 42 (e.g., the evaporator) is configured to transfer heat energy out of the dried compressed air flowing in the air passage 56 and into the expanded, cooled refrigerant flowing in the refrigerant passage 54. The refrigeration heat exchanger 42 thereby precools the compressed air as well as evaporates the refrigerant to continue the refrigeration cycle.

The cryogenic cooling system 38 and its cryogenic heat exchanger 44 are configured to further cool the (e.g., precooled) compressed air to provide the compressed cooled air to the combustor test section 12. The cryogenic cooling system 38 of FIG. 1, for example, includes a cryogenic liquid source 58, one or more valves 60-64, the cryogenic heat exchanger 44 and a flowmeter 66. This cryogenic cooling system 38 also includes one or more cryogenic cooling system circuits 68-70; e.g., open loop flowpaths. The source circuit 68 extends longitudinally between and fluidly couples an outlet from the cryogenic liquid source 58 and an inlet into the upstream pressure relief valve 60. The heat exchange circuit 69 extends longitudinally between and fluidly couples a first outlet from the upstream pressure relief valve 60 and a cryogenic fluid exhaust 72 to the external environment 30. Between the upstream pressure relief valve 60 and the cryogenic fluid exhaust 72, the heat exchange circuit 69 of FIG. 1 extends (e.g., sequentially) through the emergency shutoff valve 61, the intermediate pressure relief valve 64, the control valve 62, the downstream pressure relief valve 63, the cryogenic heat exchanger 44 and the flowmeter 66. The bypass circuit 70 extends longitudinally between and fluidly couples a second outlet from the upstream pressure relief valve 60 and the cryogenic fluid exhaust 72. This bypass circuit 70 bypasses (e.g., does not extend through, may not be fluidly coupled with) each of the cryogenic cooling system members 44, 61, 62, 63 and 66. With the arrangement of FIG. 1, the heat exchange circuit 69 and the bypass circuit 70 are fluidly coupled in parallel between the source circuit 68 and the cryogenic fluid exhaust 72.

The cryogenic liquid source 58 is configured to output a flow of a cryogenic liquid during operation of the test system 10. Examples of the cryogenic liquid include, but are not limited to, liquid nitrogen ($N_2$) and liquid helium (He). The cryogenic liquid source 58 may be or otherwise include one or more cryogenic liquid reservoirs 74. Examples of each cryogenic liquid reservoir 74 include a tank, a cylinder, a pressure vessel, a bladder or any other type of insulated cryogenic liquid storage container. The cryogenic liquid source 58 of FIG. 1 also includes a manifold 76, which manifold 76 fluidly couples the cryogenic liquid reservoirs 74 (e.g., in parallel) to the source circuit 68.

When a pressure of the cryogenic liquid in the source circuit 68 is equal to or below a (e.g., set or variable) threshold value (e.g., during normal operation), the upstream pressure relief valve 60 is configured to (a) fluidly couple the source circuit 68 to the heat exchange circuit 69 and (b) fluidly decouple the source circuit 68 from the bypass circuit 70. However, in the event the pressure of the cryogenic liquid in the source circuit 68 rises above the threshold value, the upstream pressure relief valve 60 is configured to fluidly couple the source circuit 68 to the bypass circuit 70. The upstream pressure relief valve 60 may thereby bleed off (e.g., dump) some of the cryogenic liquid flowing from the source circuit 68 to the heat exchange circuit 69 to reduce the pressure of the cryogenic liquid in the source circuit 68.

The emergency shutoff valve 61 is configured to move between an (e.g., fully) open position and a (e.g., fully) closed position. When the emergency shutoff valve 61 is in the open position, the cryogenic liquid may pass through the emergency shutoff valve 61 substantially unobstructed/unimpeded. However, when the emergency shutoff valve 61 is in the closed position, the emergency shutoff valve 61 may prevent (or substantially limit) the flow of the cryogenic liquid therethrough. This emergency shutoff valve 61 may be electronically controlled such that one or more safety systems for the test system 10 may automatically trigger the emergency shutoff valve 61 to close. The emergency shutoff valve 61 may also or alternatively be manually controlled such that personnel operating the test system 10 may manually trigger the emergency shutoff valve 61 to close.

The control valve 62 is configured to move between an (e.g., fully) open position and a (e.g., fully or partially) closed position. The control valve 62 may (or may not) also be configured to move to and remain at one or more intermediate positions between the open position and the closed position. When the control valve 62 is in the open position, the cryogenic liquid may pass through the control valve 62 substantially unobstructed/unimpeded. However, when the control valve 62 is in the closed position, the control valve 62 may prevent or reduce the flow of the cryogenic liquid therethrough. This control valve 62 may be electronically controlled by a controller 78. The controller 78 of FIG. 1, for example, is in signal communication with the control valve 62 and the flowmeter 66. This controller 78 may be configured to control operation of the control valve 62 (e.g., control how much the control valve 62 is opened or closed/control a position of the control valve 62) based on a signal output from the flowmeter 66. Thus, a flowrate and/or a pressure of the cryogenic liquid flowing through the heat exchange circuit 69 to the cryogenic heat exchanger 44 may be tailored based on feedback from the flowmeter 66. Moreover, the controller 78 may tailor the flowrate and/or the pressure of the cryogenic liquid flowing to the cryogenic heat exchanger 44 such that the compressed cooled air output from the cryogenic heat exchanger 44 has a select temperature (or is within a select temperature range). While the flowmeter 66 of FIG. 1 is positioned downstream of the cryogenic heat exchanger 44 in FIG. 1, it is contemplated the flowmeter 66 may alternatively be positioned upstream of the cryogenic heat exchanger 44 or elsewhere in other embodiments.

When a pressure of the cryogenic liquid in an upstream portion 80 of the heat exchange circuit 69 is equal to or below a (e.g., set or variable) threshold value (e.g., during normal operation), the downstream pressure relief valve 63 is configured to (a) fluidly couple the upstream portion 80 of the heat exchange circuit 69 to a downstream portion 82 of the heat exchange circuit 69 and (b) fluidly decouple the upstream portion 80 of the heat exchange circuit 69 from the bypass circuit 70. However, in the event the pressure of the cryogenic liquid in the upstream portion 80 of the heat exchange circuit 69 rises above the threshold value, the downstream pressure relief valve 63 is configured to fluidly couple the upstream portion 80 of the heat exchange circuit 69 to the bypass circuit 70. The downstream pressure relief valve 63 may thereby bleed off (e.g., dump) some of the cryogenic liquid flowing in the heat exchange circuit 69 to reduce the pressure of the cryogenic liquid in the heat exchange circuit 69.

When a pressure of the cryogenic liquid in an intermediate portion of the heat exchange circuit 69 between the valves 61 and 62 is equal to or below a (e.g., set or variable) threshold value (e.g., during normal operation), the intermediate pressure relief valve 64 is configured to (a) fluidly couple the intermediate portion of the heat exchange circuit 69 to the downstream portion 82 of the heat exchange circuit 69 and (b) fluidly decouple the intermediate portion of the heat exchange circuit 69 from the bypass circuit 70. However, in the event the pressure of the cryogenic liquid in the intermediate portion of the heat exchange circuit 69 rises above the threshold value (e.g., in an unlikely event the valves 61 and 62 close simultaneously), the intermediate pressure relief valve 64 is configured to fluidly couple the intermediate portion of the heat exchange circuit 69 to the bypass circuit 70. The intermediate pressure relief valve 64 may thereby bleed off (e.g., dump) some of the cryogenic liquid in the heat exchange circuit 69 to reduce the pressure of the cryogenic liquid in the heat exchange circuit 69.

This cryogenic heat exchanger 44 includes a cryogenic liquid passage 84 and an air passage 86. The cryogenic liquid passage 84 is part of the heat exchange circuit 69 and receives the cryogenic liquid from the cryogenic liquid source 58. The air passage 86 is part of the air circuit 40 and receives the compressed precooled air from the refrigeration cooling system 36. The cryogenic heat exchanger 44 is configured to transfer heat energy out of the compressed precooled air flowing in the air passage 86 and into the cryogenic liquid flowing in the cryogenic liquid passage 84. The cryogenic heat exchanger 44 thereby further cools the compressed precooled air and outputs the compressed cooled air to the combustor test section 12. As the compressed air is cooled, the cryogenic liquid may change phase into a gaseous cryogenic fluid. This gaseous cryogenic fluid is provided to the cryogenic fluid exhaust 72 for exhausting into the external environment 30.

In some embodiments, a quantity of dry ice 88 may also be arranged with the cryogenic heat exchanger 44. The dry ice 88, for example, may be placed on top of the cryogenic heat exchanger 44, on a side of the cryogenic heat exchanger 44 and/or in a compartment of the cryogenic heat exchanger 44. Provision of the dry ice 88 may reduce an initial cooldown time of the cryogenic heat exchanger 44 (e.g., at a start of operation of the test system 10). Provision of the dry ice 88 may also provide supplemental cooling of the compressed air flowing through the air passage 86. In particular, the cryogenic heat exchanger 44 may also transfer heat energy out of the compressed precooled air flowing in the air passage 86 and into the dry ice 88.

By utilizing the cryogenic liquid (and optionally the dry ice 88), the air system 14 of the present disclosure may provide the compressed cooled air to the combustor test section 12 at a stable temperature well below the capability of a typical prior art cooling system. The air system 14 of the present disclosure, for example, may provide the compressed cooled air to the combustor test section 12 at a stable temperature equal to or below negative thirty degrees Fahrenheit (−30° F.), negative thirty-five degrees Fahrenheit (−35° F.) or negative forty degrees Fahrenheit (−40° F.). The refrigeration cooling system 36, on the other hand, may output the compressed precooled air at a temperature between negative five degrees Fahrenheit (−5° F.) and negative fifteen degrees Fahrenheit (−15° F.). Moreover, a cost for cryogenic liquid such as liquid nitrogen is relatively inexpensive compared to costs associated with a typical prior art cooling system.

In some embodiments, one or more of the test system components (e.g., 12, 44, 60-63 and 66) may be arranged within a test cell 90 while one or more of the other test system components (e.g., 32, 34, 36 and 58) may be arranged outside of the test cell 90.

In some embodiments, the air system 14 may be configured without the refrigeration cooling system 36. In such embodiments, the cryogenic cooling system 38 and/or the dry ice 88 may cool the ambient temperature compressed air received from the compressed air source 32 down to operating temperature.

In some embodiments, the air system 14 may be configured without the air dryer 34.

Figure 2:
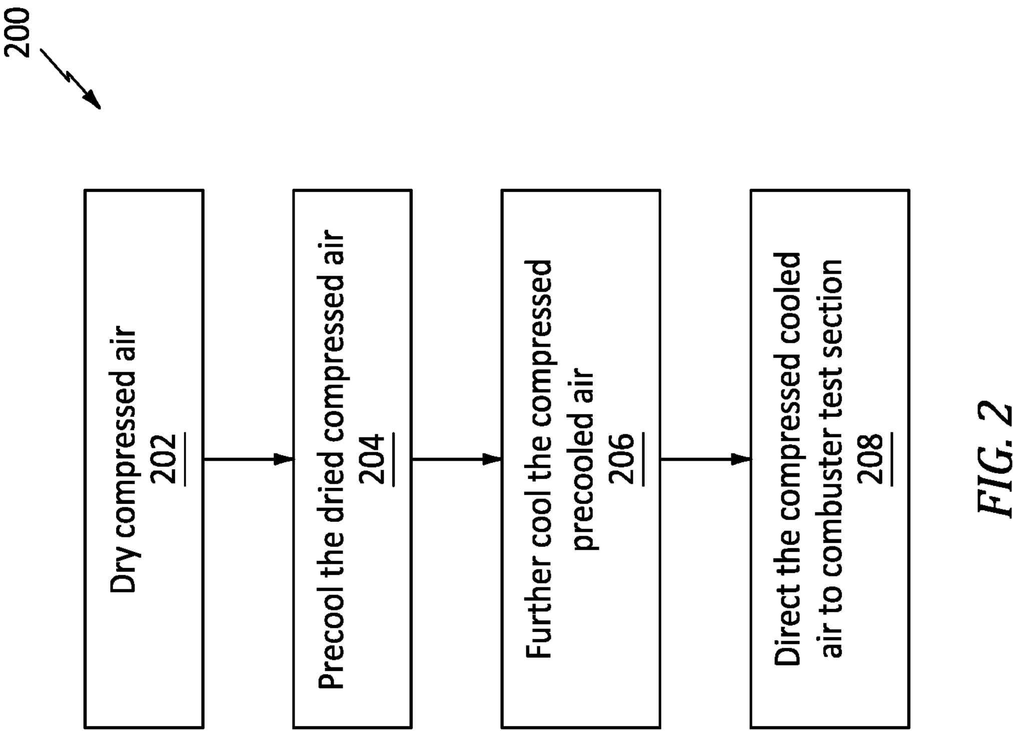
FIG. 2 is a flow diagram of a method for testing the one or more components of the engine.

FIG. 2 is a flow diagram of a method 200 for testing one or more components of an engine. For ease of description, the test method 200 is described below with respect to the test system 10 of FIG. 1. The test method 200 of the present disclosure, however, is not limited to utilizing such an exemplary test system.

In step 202, compressed air is dried. The compressed air output from the compressed air source 32, for example, is directed through the air dryer 34 to lower the dewpoint temperature of the compressed air below minus thirty or forty degrees Fahrenheit (−30° F., −40° F.); e.g., equal to or below minus fifty degrees Fahrenheit (−50° F.) or below.

In step 204, the dried compressed air is precooled. The dried compressed air output from the air dryer 34, for example, is directed through the refrigeration heat exchanger 42. As the dried compressed air flows within the air passage 56, the refrigeration heat exchanger 42 transfers heat energy out of the dried compressed air and into the refrigerant within the refrigerant passage 54. The refrigeration heat exchanger 42 thereby cools the dried compressed air and outputs compressed precooled air.

In step 206, the compressed precooled air is further cooled to operating temperature. The compressed precooled air output from the refrigeration heat exchanger 42, for example, is directed through the cryogenic heat exchanger 44. As the compressed precooled air flows within the air passage 86, the cryogenic heat exchanger 44 transfers additional heat energy out of the compressed precooled air and into the cryogenic liquid flowing within the cryogenic liquid passage 84. The cryogenic heat exchanger 44 thereby further cools the compressed precooled air and outputs the compressed cooled air at operative temperature; e.g., at, about or between −30° F. and −40° F.

In step 208, the compressed cooled air is directed into the combustor test section 12 for operation of the combustor test section 12 and testing of the engine component(s).

The air system 14 is described above as delivering the compressed cooled air to the combustor test section 12. The air system 14 of the present disclosure, however, may alternatively provide the compressed cooled air to various other devices such as an insulated container in which the engine component(s) to be tested by the test system 10 are disposed. With such an arrangement, engine component(s) may be tested within a cold environment, rather than an environment of a combustor. The insulated container, however, may have a similar configuration to the test section housing 16 described above.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A test system for a component of an engine, comprising:

a combustor test section including a fuel injector, an ignitor and a combustion chamber, the fuel injector configured to direct fuel into the combustion chamber for mixing with cooled air, and the ignitor configured to ignite a mixture of the fuel and the cooled air within the combustion chamber; and an air system configured to deliver the cooled air to the combustor test section, the air system including a compressed air source, a cryogenic cooling system and an air circuit, the cryogenic cooling system comprising a cryogenic heat exchanger, and the air circuit extending through the cryogenic heat exchanger and fluidly coupling the compressed air source to the combustor test section;

the air system further including a refrigeration cooling system with a refrigeration heat exchanger, the air circuit further extending through the refrigeration heat exchanger, and the cryogenic heat exchanger between the refrigeration heat exchanger and the combustor test section along the air circuit.

2. The test system of claim 1, wherein the cryogenic cooling system further comprises a cryogenic liquid source;

the cryogenic heat exchanger includes a cryogenic liquid passage and an air passage;

the cryogenic liquid passage is fluidly coupled with and downstream of the cryogenic liquid source; and the air circuit comprises the air passage.

3. The test system of claim 2, wherein the cryogenic liquid passage is configured to receive a cryogenic liquid from the cryogenic liquid source;

the air passage is configured to receive compressed air from the compressed air source; and the cryogenic heat exchanger is configured to transfer heat energy from the compressed air flowing in the air passage into the cryogenic liquid flowing in the cryogenic liquid passage.

4. The test system of claim 2, wherein the cryogenic liquid source comprises a reservoir containing liquid nitrogen.

5. The test system of claim 2, wherein the cryogenic cooling system further comprises a heat exchange circuit, a bypass circuit and a pressure relief valve;

the heat exchange circuit comprises the cryogenic liquid passage;

the bypass circuit bypasses the cryogenic heat exchanger; and the heat exchange circuit and the bypass circuit are downstream of and fluidly coupled to the cryogenic liquid source through the pressure relief valve.

6. The test system of claim 2, wherein the cryogenic cooling system further comprises an emergency shutoff valve fluidly coupled with and between the cryogenic liquid source and the cryogenic liquid passage.

7. The test system of claim 2, wherein the cryogenic cooling system further comprises a control valve fluidly coupled with and between the cryogenic liquid source and the cryogenic liquid passage.

8. The test system of claim 7, wherein the cryogenic cooling system further comprises a flowmeter and a controller in signal communication with the control valve and the flowmeter; and the controller is configured to control operation of the control valve based on a signal output from the flowmeter.

9. The test system of claim 8, wherein the cryogenic liquid passage is fluidly coupled with and between the control valve and the flowmeter, and the flowmeter is downstream of the cryogenic liquid passage.

10. The test system of claim 1, further comprising a quantity of dry ice arranged with the cryogenic heat exchanger.

11. The test system of claim 1, wherein the air system further includes an air dryer;

the air circuit further extends through the air dryer; and the cryogenic heat exchanger is between the air dryer and the combustor test section along the air circuit.

12. The test system of claim 11, wherein the air dryer is configured to lower a dewpoint temperature of compressed air received from the compressed air source to negative fifty degrees Fahrenheit or lower.

13. A method for testing a component of an engine, comprising:

directing compressed air into an air passage of a cryogenic heat exchanger;

cooling the cryogenic heat exchanger with a quantity of dry ice;

directing a cryogenic liquid into a cryogenic liquid passage of the cryogenic heat exchanger;

transferring heat energy from the compressed air in the air passage, through the cryogenic heat exchanger, into the cryogenic liquid in the cryogenic liquid passage to provide cooled air; and directing the cooled air into a housing, wherein the component of the engine is disposed within an internal chamber of the housing.

14. The method of claim 13, wherein a combustor test section includes the housing; and the internal chamber comprises a combustion chamber.

15. A method for testing a component of an engine, comprising:

directing compressed air into an air passage of a cryogenic heat exchanger;

directing a cryogenic liquid into a cryogenic liquid passage of the cryogenic heat exchanger;

transferring heat energy from the compressed air in the air passage, through the cryogenic heat exchanger, into the cryogenic liquid in the cryogenic liquid passage to provide cooled air;

directing the cooled air into a housing, wherein the component of the engine is disposed within an internal chamber of the housing; and directing the compressed air through a refrigeration heat exchanger of a refrigeration cooling system to precool the compressed air, wherein the refrigeration heat exchanger is upstream of the cryogenic heat exchanger.

16. The method of claim 13, further comprising directing the compressed air through an air dryer to lower a dewpoint temperature of the compressed air to negative fifty degrees Fahrenheit or lower, wherein the air dryer is upstream of the cryogenic heat exchanger.

17. The method of claim 15, wherein a combustor test section includes the housing; and the internal chamber comprises a combustion chamber.

18. The method of claim 15, further comprising directing the compressed air through an air dryer to lower a dewpoint temperature of the compressed air to negative fifty degrees Fahrenheit or lower, wherein the air dryer is upstream of the cryogenic heat exchanger.

* * * * *